(12) United States Patent
Lin et al.

(10) Patent No.: US 10,640,667 B1
(45) Date of Patent: May 5, 2020

(54) DIGITAL PRINTING INK

(71) Applicant: Taiwan Textile Research Institute, New Taipei (TW)

(72) Inventors: Chia-Yi Lin, New Taipei (TW); Po-Chuen Lin, New Taipei (TW)

(73) Assignee: Taiwan Textile Research Institute, New Taipei (TW)

( * ) Notice: Subject to any disclaimer, the term of this patent is extended or adjusted under 35 U.S.C. 154(b) by 0 days.

(21) Appl. No.: 16/212,702

(22) Filed: Dec. 7, 2018

(30) Foreign Application Priority Data

Oct. 17, 2018  (TW) .............................. 107136483 A

(51) Int. Cl.
  *C09D 11/38*   (2014.01)
  *C09D 11/104*  (2014.01)
  *B41M 5/00*    (2006.01)
  *C09D 11/033*  (2014.01)
  *C09D 11/08*   (2006.01)

(52) U.S. Cl.
  CPC .......... *C09D 11/38* (2013.01); *B41M 5/0023* (2013.01); *C09D 11/033* (2013.01); *C09D 11/08* (2013.01); *C09D 11/104* (2013.01)

(58) Field of Classification Search
  CPC ....... C09D 11/38; C09D 11/08; C09D 11/104; C09D 11/033; B41M 5/0023
  USPC ................................................. 523/160, 161
  See application file for complete search history.

(56) References Cited

U.S. PATENT DOCUMENTS

| 6,325,501 | B2 | 12/2001 | Kuwabara et al. | |
| 2017/0233595 | A1* | 8/2017 | Erdodi ................. | C09D 11/322 428/201 |

FOREIGN PATENT DOCUMENTS

| CN | 101184803 | | 5/2008 |
| CN | 107686683 | | 2/2018 |
| EP | 1885931 | | 5/2012 |
| TW | 200610789 | | 4/2006 |
| TW | 200641201 | | 12/2006 |
| TW | 200643253 | | 12/2006 |
| TW | 200702182 | | 1/2007 |
| TW | I477402 | | 3/2015 |
| TW | I617713 | | 3/2018 |
| WO | 2005113692 | | 12/2005 |
| WO | WO 2005/113692 | * | 12/2005 |
| WO | 2010059562 | | 5/2010 |

OTHER PUBLICATIONS

"Office Action of Taiwan Counterpart Application", dated May 31, 2019, pp. 1-4.
"Office Action of Taiwan Counterpart Application", dated Dec. 31, 2019, p. 1-p. 9.

* cited by examiner

*Primary Examiner* — Doris L Lee

(74) *Attorney, Agent, or Firm* — JCIPRNET

(57) ABSTRACT

A digital printing ink including a moisture absorption agent, a surfactant, an antifreeze agent, and a balance of a solvent is provided. The moisture absorption agent includes a block copolyester-ether. The surfactant includes a acrylic block copolymer. The antifreeze agent includes glycol. The digital printing ink has a viscosity of 2 cps to 12 cps, a surface tension of 28 dyne/cm to 40 dyne/cm, and a pH value of 6 to 8. A content of the moisture absorption agent is 5 wt. % to 11 wt. %, a content of the surfactant is 3 wt. % to 10 wt. %, and a content of the antifreeze agent is 3 wt. % to 5 wt. %, based on the total weight of the digital printing ink.

5 Claims, No Drawings

DIGITAL PRINTING INK

CROSS-REFERENCE TO RELATED APPLICATION

This application claims the priority benefit of Taiwan application serial no. 107136483, filed on Oct. 17, 2018. The entirety of the above-mentioned patent application is hereby incorporated by reference herein and made a part of this specification.

TECHNICAL FIELD

The disclosure relates to an ink, and more particularly, to a digital printing ink.

BACKGROUND

For functional apparel currently on the market (such as sportswear), a nip and dip process is mostly used to provide functional dyeing to the fabric to achieve the desired function. However, since the nip and dip process discharges a large amount of unused dye and water, the issue that resources are excessively wasted occurs.

In order to solve the above issue, coating or screen printing has also been used to provide functional ink to the full or partial fabric. However, in the process of using coating or screen printing, a high concentration of waste liquid is generated, and the function of the ink is not readily controlled due to the permeability of the ink.

SUMMARY

The disclosure provides a digital printing ink having a moisture absorption agent and capable of being applied to functional apparel.

The disclosure provides a digital printing ink having chitosan as an antibacterial agent and capable of being applied to functional apparel.

A digital printing ink of the disclosure includes a moisture absorption agent, a surfactant, an antifreeze agent, and a balance of a solvent. The moisture absorption agent includes a block copolyester-ether. The surfactant includes an acrylic block copolymer. The antifreeze agent includes glycol. The digital printing ink has a viscosity of 2 cps to 12 cps, a surface tension of 28 dyne/cm to 40 dyne/cm, and a pH value of 6 to 8. A content of the moisture absorption agent is 5 wt. % to 11 wt. %, a content of the surfactant is 3 wt. % to 10 wt. %, and a content of the antifreeze agent is 3 wt. % to 5 wt. %, based on the total weight of the digital printing ink.

In an embodiment of the disclosure, a coupling agent is further included. The coupling agent is, for example, a polymer having an ethylene oxide side chain, wherein a content of the coupling agent is 0.01 wt. % to 0.35 wt. %, based on the total weight of the digital printing ink.

In an embodiment of the disclosure, a humectant is further included. The humectant is, for example, glycerol, wherein a content of the humectant is 2 wt. % to 5 wt. %, based on the total weight of the digital printing ink.

In an embodiment of the disclosure, a pH regulator is further included. The pH regulator is, for example, triethanolamine (TEOA), wherein a content of the pH regulator is 0.01 wt. % to 0.1 wt. %, based on the total weight of the digital printing ink.

According to an embodiment of the disclosure, the solvent is, for example, deionized water.

The digital printing ink of the disclosure includes chitosan, a surfactant, and a balance of a solvent. The chitosan has a weight-average molecular weight of 200,000 to 300,000. The surfactant includes a polyglycol, an ethylene oxide, or a combination thereof. The digital printing ink has a viscosity of 2 cps to 12 cps, a surface tension of 28 dyne/cm to 40 dyne/cm, and a pH value of 6 to 8. A content of the chitosan is 5 wt. % to 10 wt. %, and a content of the surfactant is 2 wt. % to 5 wt. %, based on the total weight of the digital printing ink.

In an embodiment of the disclosure, a pH regulator is further included. The pH regulator is, for example, TEOA, a phosphate solution, or a combination thereof, wherein a content of the pH regulator is 0.1 wt. % to 0.4 wt. %, based on the total weight of the digital printing ink.

In an embodiment of the disclosure, a coupling agent is further included. The coupling agent is, for example, a polymer having an ethylene oxide side chain, wherein a content of the coupling agent is 0.01 wt. % to 0.06 wt. %, based on the total weight of the digital printing ink.

In an embodiment of the disclosure, a humectant is further included. The humectant is, for example, glycerol, wherein a content of the humectant is 4 wt. % to 6 wt. %, based on the total weight of the digital printing ink.

In an embodiment of the disclosure, a cosolvent is further included. The cosolvent is, for example, propylene glycol methyl ether, wherein a content of the cosolvent is 4 wt. % to 6 wt. %, based on the total weight of the digital printing ink.

According to an embodiment of the disclosure, the solvent is, for example, deionized water.

In an embodiment of the disclosure, the polyglycol has, for example, a weight-average molecular weight of 400 to 600.

Based on the above, in the digital printing ink of the disclosure, since a moisture absorption agent is included, the digital printing ink may have humidity-regulating capability when applied to a fabric. Further, in the digital printing ink of the disclosure, since chitosan is included, the digital printing ink may have antibacterial capability when applied to a fabric. Further, the digital printing ink of the disclosure has a viscosity of 2 cps to 12 cps, a surface tension of 28 dyne/cm to 40 dyne/cm, and a pH value of 6 to 8, and therefore the digital printing ink of the disclosure printing ink has suitable fluidity, which may facilitate droplet formation and permeability of the digital printing ink. Moreover, there is no precipitation in the ink that causes the nozzle of the printing device to clog, and the nozzle of the printing device is not corroded.

In order to make the aforementioned features and advantages of the disclosure more comprehensible, embodiments accompanied with figures are described in detail below.

DETAILED DESCRIPTION OF DISCLOSED EMBODIMENTS

A digital printing ink of the disclosure may provide a fabric with full or partial functionality through digital precision printing, and therefore the digital printing ink may be applied to clothing, furniture, etc., such as sportswear, yoga clothes, vest underwear, tablecloths, bedding sets, etc. In addition, since the digital printing ink of the disclosure is formed on the fabric by digital precision printing, the dosage and processing energy demand may be reduced by about two-thirds compared with the conventional nip and dip process or coating method, and the functionality of the ink may be accurately controlled. Furthermore, since the digital printing ink of the disclosure contains a moisture absorption agent and/or a chitosan, the fabric may be provided with humidity-regulating capability and/or antibacterial capability.

The digital printing ink of the disclosure is described in detail below.

Digital Printing Ink with Humidity-Regulating Capability

The digital printing ink with humidity-regulating capability of the disclosure mainly contains a moisture absorption agent, a surfactant, an antifreeze agent, and a balance of a solvent. The digital printing ink of the disclosure has a viscosity of 2 cps to 12 cps, and therefore the ink droplets printed may have suitable size, and the ink may have a suitable fluidity to facilitate digital precision printing. Further, the digital printing ink with humidity-regulating capability of the disclosure has a surface tension of 28 dyne/cm to 40 dyne/cm, and thus may facilitate ink droplet formation and ink permeability. In an embodiment of the disclosure, the ink printed through the digital precision printing has, for example, a particle size of 0.25 μm to 0.6 μm, thereby avoiding the issue of a clogged nozzle during the digital precision printing, and the ink may have better color rendering characteristics. In addition, the digital printing ink with humidity-regulating capability of the disclosure has a pH value of 6 to 8, and therefore the nozzle of the printing device may be prevented from being corroded and the ink may be prevented from being deposited at the nozzle and causing clogging.

In the digital printing ink with humidity-regulating capability of the disclosure, the moisture absorption agent includes a block copolyester-ether. Examples of the block copolyester-ether are, for example, polyether ester PEM (trade name, manufactured by Far East New Century Co., Ltd.) or polyether ester SRT (trade name, manufactured by Sino-Japanese Synthetic Chemical Co., Ltd.) The content of the moisture absorption agent is 5 wt. % to 11 wt. %, based on the total weight of the digital printing ink of the disclosure. Within this range, the moisture absorption agent is effective in absorbing moisture. For example, when the moisture absorption agent is included in the digital printing ink with humidity-regulating capability of the disclosure in the above content range, after the ink is printed on the fabric to form a functional pattern, sweat from the skin of the user may be effectively absorbed, and when the sweat evaporates, the user may be cool and comfortable. When the content of the moisture absorption agent is less than 5 wt. %, the digital printing ink cannot have a good moisture absorption effect. When the content of the moisture absorption agent is greater than 11 wt. %, the surface tension of the digital printing ink is lowered, and the degree of diffusion of the moisture-absorbing ink is not readily controlled, and therefore the functional pattern may be excessively spread and the original pattern design may be destroyed.

In the digital printing ink with humidity-regulating capability of the disclosure, the surfactant includes an acrylic block copolymer. An example of the acrylic block copolymer is, for example, Dispex® Ultra PX 4575 (trade name, manufactured by BASF Corporation). The content of the surfactant is 3 wt. % to 10 wt. %, based on the total weight of the digital printing ink with humidity-regulating capability of the disclosure. Within this range, the surfactant maintains dimensional stability of particles (e.g., moisture absorption agent, etc.) in the ink. When the content of the surfactant is less than 3 wt. %, the dispersoids in the ink are not effectively dispersed, and precipitation or aggregation may occur. When the content of the surfactant is greater than 10 wt. %, the condensing effect is lost among the dispersoids due to excessive repulsion by the surfactant.

In the digital printing ink with humidity-regulating capability of the disclosure, the antifreeze agent includes glycol. The content of the antifreeze agent is 3 wt. % to 5 wt. %, based on the total weight of the digital printing ink of the disclosure. The antifreeze agent may prevent the digital printing ink of the disclosure from coagulating at too low a temperature and affecting the printing. When the content of the antifreeze agent is less than 3 wt. %, the digital printing ink may not be sufficiently resistant to coagulation at low temperatures. When the content of the antifreeze agent is 3 wt. % to 5 wt. %, in addition to having sufficient anti-coagulation effect, the antifreeze agent may also have a moisturizing function. When the content of the antifreeze agent is greater than 5 wt. %, an acidic substance is more readily generated, which causes corrosion to the nozzle of the printing device.

In the digital printing ink with humidity-regulating capability of the disclosure, a coupling agent may be further included. The coupling agent is, for example, a polymer having an ethylene oxide side chain. An example of the polymer of the ethylene oxide side chain is, for example, Surfynol 465 (trade name, manufactured by Nissin Chemical Industry Co., Ltd.) The content of the coupling agent is 0.01 wt. % to 0.35 wt. %, based on the total weight of the digital printing ink with humidity-regulating capability of the disclosure. The coupling agent effectively controls the surface tension of the ink, thereby improving the smoothness during printing and optimizing the droplet-forming state of the ink. When the content of the coupling agent is less than 0.01 wt. %, the surface tension of the ink cannot be effectively lowered, so that the smoothness during printing and the permeability of the ink to the fabric are affected. When the content of the coupling agent is greater than 0.35 wt. %, the surface tension of the ink is too low, so that the ink is likely to be remained at the surface of the nozzle of the printing device, thus affecting the droplet-forming state of the ink. In other words, the digital printing ink with humidity-regulating capability of the disclosure may have a surface tension of 28 dyne/cm to 40 dyne/cm by including the coupling agent in a suitable content, and the suitable content is, for example, 0.01 wt. % to 0.35 wt. %.

In the digital printing ink with humidity-regulating capability of the disclosure, a humectant may be further included. The humectant is, for example, glycerol. The content of the humectant is 2 wt. % to 5 wt. %, based on the total weight of the digital printing ink with humidity-regulating capability of the disclosure. Within this range, the humectant ensures that the digital printing ink is not deposited due to coagulation during the printing process or blocking the nozzle. When the content of the humectant is less than 2 wt. %, the digital printing ink may not be effectively prevented from coagulation. When the content of the humectant is greater than 5 wt. %, the drying rate of the ink on the fabric is likely to be too slow, so that the production rate of the overall digital printing process is lowered.

In the digital printing ink with humidity-regulating capability of the disclosure, a pH regulator may be further included. The pH regulator is, for example, triethanolamine. The content of the pH regulator is 0.01 wt. % to 0.1 wt. %, based on the total weight of the digital printing ink with humidity-regulating capability of the disclosure. Within this range, the pH regulator ensures that the pH value of the digital printing ink with humidity-regulating capability of the disclosure is 6 to 8. When the content of the pH regulator is less than 0.01 wt. %, the pH value of the digital printing ink may not be effectively prevented from being maintained from 6 to 8. When the content of the pH regulator is greater than 0.1 wt. %, the pH value of the ink tends to be alkaline, thus affecting the solubility of each component in the ink, and thus precipitation readily occurs or the nozzle is blocked.

In the digital printing ink with humidity-regulating capability of the disclosure, the solvent is, for example, deionized water, but the disclosure is not limited thereto.

The digital printing ink with humidity-regulating capability of the disclosure is tested and evaluated below.

The compositions of the digital printing inks of Experimental example 1 to Experimental example 5 are shown in Table 1. In each Experimental example, the humectant is glycerin, the antifreeze agent is glycol, the surfactant is Disper Ultra PX4575 (manufactured by BASF Corporation), the coupling agent is Surfynol 465 (manufactured by Nissin Chemical Industry Co., Ltd.), and the pH regulator is triethanolamine.

TABLE 1

|  | Experimental example 1 | Experimental example 2 | Experimental example 3 | Experimental example 4 | Experimental example 5 |
| --- | --- | --- | --- | --- | --- |
| Moisture absorption agent | Polyether ester SRT 5 wt. % | Polyether ester SRT 8 wt. % | Polyether ester SRT 10 wt. % | Polyether ester SRT 11 wt. % | Polyether ester PEM 5 wt. % |
| Humectant | 3 wt. % | 3 wt. % | 3 wt. % | 3 wt. % | 3 wt. % |
| Antifreeze agent | 5 wt. % | 5 wt. % | 5 wt. % | 5 wt. % | 3 wt. % |
| Surfactant | 3.5 wt. % | 5 wt. % | 7 wt. % | 10 wt. % | 4 wt. % |
| Coupling agent | 0.28 wt. % | 0.04 wt. % | 0.10 wt. % | — | 0.33 wt. % |
| pH regulator | — | — | 0.05 wt. % | 0.10 wt. % | 0.04 wt. % |
| Deionized water | 83.22 wt. % | 78.96 wt. % | 74.85 wt. % | 70.9 wt. % | 84.63 wt. % |
| Viscosity (cps) | 3.26 | 7.1 | 10.2 | 11.6 | 3.84 |
| Surface tension (dyne/cm) | 31.68 | 30.98 | 32.2 | 36.2 | 28.2 |
| pH value | 6.35 | 6.06 | 6.14 | 6.73 | 7.73 |
| Test nozzle | EPSON DX5 | EPSON DX5 | EPSON DX5 StarFire SG1024/LA | StarFire SG1024/LA | EPSON DX5 |

As may be seen from Table 1, the inks of Experimental example 1 to Experimental example 5 have a viscosity of 2 cps to 12 cps, a surface tension of 28 dyne/cm to 40 dyne/cm, and a pH value of 6 to 8. Therefore, the inks of Experimental example 1 to Experimental example 5 have suitable fluidity, may facilitate droplet formation and permeability, and may prevent issues of ink deposition and nozzle clogging.

<Storage Stability Test>

After the inks of Experimental example 1 to Experimental example 5 were placed in an oven at 60° C. and a refrigerator at 5° C. for 15 days, the inks were returned to normal temperature and observed for delamination or precipitation, and viscosity of the inks was measured. According to the test results, the inks of Experimental example 1 to Experimental example 5 are not delaminated and precipitated after being placed at high temperature and low temperature, and the change in viscosity is less than 5%, meaning the inks of Experimental example 1 to Experimental example 5 are highly stable, and may be stored at room temperature for 1 year to 2 years without deterioration.

<Cloth Color Difference Evaluation>

The inks of Experimental example 1 to Experimental example 5 were printed on a polyethylene terephthalate fabric, and the color space value (CIE Lab value) of the fabric before and after the printing was measured by a spectrophotometer (Datacolor 650). It may be seen that the CIE ΔE of the fabric before and after the inks of Experimental example 1 to Experimental example 5 were printed does not exceed 0.1, that is, the inks of Experimental example 1 to Experimental example 5 do not affect the color of the fabric.

<Fabric Selectivity>

The inks of Experimental example 1 to Experimental example 5 were printed on 100% polyester fabric, polyethylene terephthalate/nylon blend fabric, polyethylene terephthalate/cotton blend fabric, and cotton fabric. A precise printing pattern may be effectively formed on each fabric. That is, the inks of Experimental example 1 to Experimental example 5 may be applied to various fabrics on the market.

Digital Printing Ink with Antibacterial Ability

The digital printing ink with antibacterial capability of the disclosure mainly contains a chitosan, a surfactant, and a balance of a solvent. The digital printing ink of the disclosure has a viscosity of 2 cps to 12 cps, and therefore the ink droplets printed may have suitable size, and the ink may have a suitable fluidity to facilitate digital precision printing. Furthermore, the digital printing ink with antibacterial capability of the disclosure has a surface tension of 28 dyne/cm to 40 dyne/cm, and thus may facilitate ink droplet formation and ink permeability. In an embodiment of the disclosure, the ink sprayed through the digital precision printing has, for example, a particle size of 0.25 μm to 0.6 μm, thereby avoiding the issue of a clogged nozzle during the digital precision printing, and the ink may have better color rendering characteristics. In addition, the digital printing ink with antibacterial capability of the disclosure has a pH value of 6 to 8, and therefore the nozzle of the printing device may be prevented from being corroded and the ink may be prevented from being deposited at the nozzle and causing clogging.

In the digital printing ink with antibacterial capability of the disclosure, the chitosan is used as an antibacterial material. The chitosan of the disclosure has a weight-average molecular weight of 200,000 to 300,000. If the weight-average molecular weight is less than 200,000, then the adhesion of the digital printing ink to fabric is poor, resulting in poor washing fastness of the printed fabric, and long-lasting antibacterial effects cannot be maintained; on the other hand, if the weight-average molecular weight is greater than 300,000, then the dispersibility of the chitosan in the digital printing ink is poor, and precipitation readily occurs in the ink or on the fabric, and the issue of nozzle clogging may even occur. The content of the chitosan is 5 wt. % to 10 wt. %, based on the total weight of the digital printing ink with antibacterial capability of the disclosure. Within this range, the chitosan may effectively inhibit bacterial growth. When the content of the chitosan is less than 5 wt. %, the digital printing ink cannot have a good antibacterial effect. When the content of the chitosan is greater than 10 wt. %, the solubility of chitosan colloid in the ink is lowered, and therefore the nozzle is readily clogged.

In the digital printing ink with antibacterial capability of the disclosure, the surfactant includes polyglycol, ethylene oxide, or a combination thereof. The polyglycol has, for example, a weight-average molecular weight of 400 to 600. The content of the surfactant is 2 wt. % to 5 wt. %, based on the total weight of the digital printing ink with antibacterial capability of the disclosure. Within this range, the surfactant maintains dimensional stability of particles (e.g., the chitosan as mentioned, etc.) in the ink. When the content of the surfactant is less than 2 wt. %, the dispersoids in the ink are not effectively dispersed, and precipitation or aggregation may occur. When the content of the surfactant is greater than 5 wt. %, the condensing effect is lost among the dispersoids due to excessive repulsion by the surfactant.

In the digital printing ink with antibacterial capability of the disclosure, a coupling agent may be further included. The coupling agent is, for example, a polymer having an ethylene oxide side chain. An example of the polymer having an ethylene oxide side chain is, for example, Surfynol 465 (trade name, manufactured by Nissin Chemical Industry Co., Ltd.) The content of the coupling agent is 0.01 wt. % to 0.06 wt. %, based on the total weight of the digital printing ink with antibacterial capability of the disclosure. The coupling agent effectively controls the surface tension of the ink, thereby improving the smoothness during printing and optimizing the droplet-forming state of the ink. When the content of the coupling agent is less than 0.01 wt. %, the surface tension of the ink cannot be effectively lowered, so that the smoothness during printing and the permeability of the ink to the fabric are affected. When the content of the coupling agent is greater than 0.06 wt. %, the surface tension of the digital printing ink is too low, so that the ink is likely to be remained at the surface of the nozzle of the printing device during printing, thus affecting the droplet-forming state of the ink. In other words, the digital printing ink with antibacterial capability of the disclosure may have a surface tension of 28 dyne/cm to 40 dyne/cm by further including the coupling agent in a suitable content, and the suitable content is, for example, 0.01 wt. % to 0.06 wt. %.

In the digital printing ink with antibacterial capability of the disclosure, a humectant may be further included. The humectant is, for example, glycerol. The content of the humectant is 4 wt. % to 6 wt. %, based on the total weight of the digital printing ink with antibacterial capability of the disclosure. Within this range, the humectant ensures that the digital printing ink with antibacterial capability of the disclosure is not deposited due to coagulation during the printing process or blocking the nozzle. When the content of the humectant is less than 4 wt. %, the digital printing ink may not be effectively prevented from coagulation. When the content of the humectant is greater than 6 wt. %, the drying rate of the ink on the fabric is likely to be too slow, so that the production rate of the overall digital printing process is lowered.

In the digital printing ink with antibacterial capability of the disclosure, a pH regulator may be further included. The pH regulator is, for example, triethanolamine, a phosphate solution, or a combination thereof. The content of the pH regulator is 0.1 wt. % to 0.4 wt. %, based on the total weight of the digital printing ink with antibacterial capability of the disclosure. Within this range, the pH regulator ensures that the pH value of the digital printing ink with antibacterial capability of the disclosure is 6 to 8. When the content of the pH regulator is less than 0.1 wt. %, the pH value of the digital printing ink may not be effectively prevented from being maintained from 6 to 8. When the content of the pH regulator is greater than 0.4 wt. %, the pH value of the ink tends to be alkaline, thereby reducing the solubility of the chitosan in the solvent of the ink, so that the ink readily precipitates chitosan colloid and blocks the nozzle.

In the digital printing ink with antibacterial capability of the disclosure, a cosolvent may be further included. The cosolvent is, for example, propylene glycol methyl ether. The cosolvent may facilitate the dissolution of the chitosan in the solvent. The content of the cosolvent is 4 wt. % to 6 wt. %, based on the total weight of the digital printing ink with antibacterial capability of the disclosure. When the content of the cosolvent is less than 4 wt. %, the solubility of the chitosan in the ink is poor. When the content of the cosolvent is greater than 6 wt. %, the ink is readily volatilized, and the content of each component in the ink is not readily maintained.

In the digital printing ink with antibacterial capability of the disclosure, the solvent is, for example, deionized water, but the disclosure is not limited thereto.

The digital printing ink with antibacterial capability of the disclosure is tested and evaluated below.

The compositions of the digital printing inks of Experimental example A and Experimental example B are shown in Table 2. In each Experimental example, the humectant is glycerol, the cosolvent is propylene glycol methyl ether, the surfactant is polyglycol having a molecular weight of about 600 (trade name PEG 600, made by MERCK), the coupling agent is Surfynol 465 (made by Nisshin Chemical Industry Co., Ltd.), and the pH regulator is triethanolamine.

TABLE 2

|  | Experimental example A | Experimental example B |
|---|---|---|
| Chitosan | 5 wt. % | 10 wt. % |
| Humectant | 5 wt. % | 5 wt. % |
| Cosolvent | 5 wt. % | 5 wt. % |
| Surfactant | 2.4 wt. % | 4.8 wt. % |
| Coupling agent | 0.06 wt. % | — |
| pH regulator | 0.14 wt. % | 0.31 wt. % |
| Deionized water | 82.4 wt. % | 74.89 wt. % |
| Viscosity (cps) | 2.24 | 3.14 |
| Surface tension (dyne/cm) | 33.33 | 31.77 |
| pH value | 6.79 | 6.07 |
| Test nozzle | EPSON DX5 | EPSON DX5 |

As may be seen from Table 2, the inks of Experimental example A and Experimental example B have a viscosity of 2 cps to 12 cps, a surface tension of 28 dyne/cm to 40 dyne/cm, and a pH value of 6 to 8. Therefore, the inks of Experimental example A and Experimental example B have suitable fluidity, may facilitate droplet formation and permeability, and may prevent issues of ink deposition and nozzle clogging.

<Storage Stability Test>

After the inks of Experimental example A and Experimental example B were placed in an oven at 60° C. and a refrigerator at 5° C. for 15 days, the inks were returned to normal temperature and observed for delamination or precipitation, and viscosity was measured. According to the test results, the inks of Experimental example A and Experimental example B are not delaminated or precipitated after being placed at high temperature and low temperature, and the change in viscosity is less than 5%, meaning the inks of Experimental example A and Experimental example B are highly stable, and may be stored at room temperature for 1 year to 2 years without deterioration.

<Cloth Color Difference Evaluation>

The inks of Experimental example A and Experimental example B were printed on a polyethylene terephthalate fabric, and the color space value (CIE Lab value) of the fabric before and after the printing was measured by a spectrophotometer (Datacolor 650). It may be seen that the CIE ΔE of the fabric before and after the inks of Experimental example A and Experimental example B were printed does not exceed 0.14, that is, the inks of Experimental example A and Experimental example B do not affect the color of the fabric.

<Fabric Selectivity>

The inks of Experimental example 1 to Experimental example 5 were printed on 100% polyester fabric, polyethylene terephthalate/nylon blend fabric, polyethylene terephthalate/cotton blend fabric, and cotton fabric. A precise printing pattern may be effectively formed on each fabric. That is, the inks of Experimental example A and Experimental example B may be applied to various fabrics on the market.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A digital printing ink for forming an inkjet pattern on a fabric, the digital printing ink comprising:
   a moisture absorption agent comprising a block copolyester-ether;
   a surfactant comprising an acrylic block copolymer;
   an antifreeze agent comprising glycol; and
   a balance of a solvent,
   wherein the digital printing ink has a viscosity of 2 cps to 12 cps, a surface tension of 28 dyne/cm to 40 dyne/cm, and a pH value of 6 to 8, and
   wherein a content of the moisture absorption agent is 5 wt. % to 11 wt. %, a content of the surfactant is 3 wt. % to 10 wt. %, and a content of the antifreeze agent is 3 wt. % to 5 wt. %, based on a total weight of the digital printing ink.

2. The digital printing ink of claim 1, further comprising a coupling agent, wherein the coupling agent comprises a polymer having an ethylene oxide side chain, and a content of the coupling agent is 0.01 wt. % to 0.35 wt. %, based on the total weight of the digital printing ink.

3. The digital printing ink of claim 1, further comprising a humectant, wherein the humectant comprises a glycerin, and a content of the humectant is 2 wt. % to 5 wt. %, based on the total weight of the digital printing ink.

4. The digital printing ink of claim 1, further comprising a pH regulator, wherein the pH regulator comprises triethanolamine, and a content of the pH regulator is 0.01 wt. % to 0.1 wt. %, based on the total weight of the digital printing ink.

5. The digital printing ink of claim 1, wherein the solvent comprises deionized water.

* * * * *